March 20, 1962     C. P. MORRELL     3,026,130
BOILER SPUDS AND THE LIKE AND METHODS OF ATTACHING SAME
Filed June 22, 1959
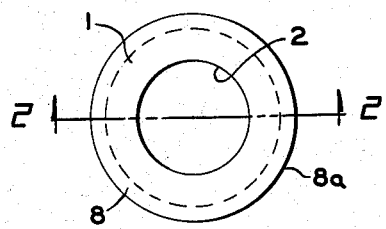
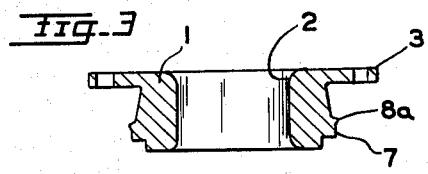
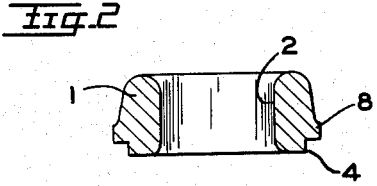
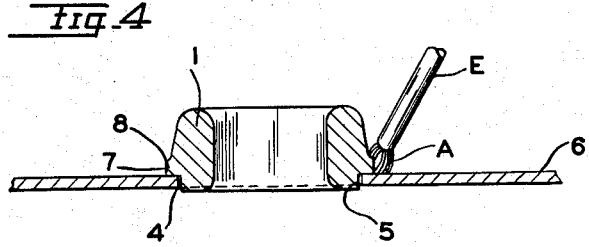
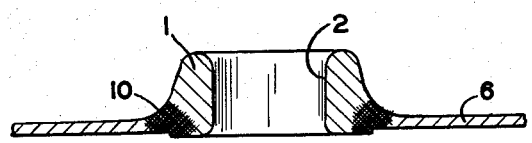
INVENTOR.
CHARLES P. MORRELL
BY
Oberlin, Maky & Donnelly
ATTORNEYS

3,026,130
BOILER SPUDS AND THE LIKE AND METHODS OF ATTACHING SAME
Charles P. Morrell, 9315 Garfield Blvd., Garfield Heights, Ohio
Filed June 22, 1959, Ser. No. 821,968
2 Claims. (Cl. 285—201)

In the construction of tanks, boilers and other like containers fabricated of sheet metal, it is customary and indeed necessary to provide a reinforcement for such apertures as are required in the walls thereof. While originally such reinforcement was mechanically attached, it has been for some time the practice to weld a so-called spud in the opening, such spud taking the form of a simple ring, internally threaded if desired, or a ring with a flange to constitute a so-called adapter.

The most practical method for welding such a spud in the aperture in the tank wall, to which it is fitted, is by means of electric arc welding, preferably using a metallic weld-rod. However, whether such arc welding operation is carried out by hand or with automatic equipment, considerable difficulty has been encountered in securing a perfect seal, as is of course necessary, as well as a smooth finish, particularly on the inner surface of the wall, which, in the case of hot water tanks, for example, is subsequently enameled or glass coated. There is always a tendency for the arc between the weld-rod and the parts being welded to wander, with resulting imperfect weld, or for the arc to burn through where the tank wall is of relatively thin gauge.

The object of the present invention is to provide a spud suitable for attachment to the wall of a boiler or like container by electric arc welding, whereby the foregoing difficulties are overcome.

A further object is to provide such a spud which is particularly adapted for attachment by automatic machine welding.

Other objects of the invention will appear as the description proceeds.

To the accomplishment of the foregoing and related ends, said invention then comprises the features and steps hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a top plan view of a spud exemplifying my improved construction;

FIG. 2 is a diametral section of such spud, as indicated by the line 2—2 on FIG. 1;

FIG. 3 is a similar section of a spud of slightly modified construction;

FIG. 4 illustrates, in part diagrammatically, the manner in which my improved spud is welded in place; and FIG. 5 is a view showing the same parts as in FIG. 4 following completion of the welding operation.

Referring to FIGS. 1 and 2, the spud there illustrated comprises essentially a ring or annulus 1, which will be of such dimensions, e.g., axial length and wall thickness, as may be required for the particular type of connection the spud is designed to provide. Thus, the inner cylindrical bore 2 may be internally threaded either before or after attachment of the spud so as to permit an exteriorly threaded pipe or other part to be connected with the spud. Similarly, as illustrated in FIG. 3, the upper or outer end of the spud may carry a flange 3 to provide a so-called adapter whereby a corresponding flange fitting may be secured to the spud and thus to the boiler or other container to which the latter is to be welded.

As best illustrated in FIGS. 2 and 4, the lower or inner portion of the spud constitutes a pilot portion 4 that is properly dimensioned so as to enter and closely fit the opening 5 in the wall 6 of the container to which the spud is to be attached. Just above such pilot portion and spaced from the inner end of the annulus 1 a distance approximately equal to the thickness of the wall 6 is a radial flange 7, the dimensions of which should be likewise related to the wall thickness of such plate 6. The distance such flange projects radially beyond the outer wall of the annulus, as well as the thickness of the flange in an axial direction, should approximately equal the thickness of the plate wall or, in other words, the distance between the lower face of the flange and the lower or inner end of the spud.

Of even more importance the flange should be formed with a sharply defined upwardly and outwardly directed edge 8, instead of merging smoothly with the outer wall of the spud as is the current practice. Indeed, in the modified form of spud illustrated in FIG. 3, the corner or edge in question of the flange may take the form of a lip 8a that still more sharply defines such edge, all for the purpose which will now be explained.

In welding a spud of the improved construction just described, as already indicated the pilot portion 4 is seated in the aperture 5 of the wall 6 with the flange 7 closely contacting the outer surface of such wall, as clearly shown in FIG. 4. Thereupon an electric arc A is struck between a suitable electrode, preferably a metal weld-rod E, and flange 7, and such arc by suitable relative movement between the electrode and the spud is caused to travel circumferentially around the flange. In such welding operation the upwardly and outwardly directed angular edge 8 or 8a of the flange will lie in proximate relation to the end of the electrode E, so that the arc A will at all times be held to the flange rather than wander to the body of the annulus or to the plate 6. As a result, the flange is quickly rendered molten, along with the contacting surface of the plate adjacent the opening 5 and the edge of such opening and contacting surface of the pilot portion 4. Any tendency for the arc to burn through, i.e., overheat such contacting edge and pilot surface, will be minimized, and if the rate of travel of the arc around the flange is properly regulated, the inwardly directed end of the spud and adjacent inner surface will merge smoothly together, as shown in FIG. 5. At the same time the metal from the flange as thus rendered molten, with additional metal from the electrode, where the latter is a metal weld-rod, will form a smooth concave fillet 10 between the annulus and the upper face of the plate, as also illustrated in FIG. 5.

It will thus be seen that as a result of my construction of spud and method of attaching the same, the quality of the weld is not only improved by eliminating the so-called "leaker problem," but by leaving a smooth inner surface where the spud enters the opening in the tank wall, any imperfection at this point in the subsequent enamel or glass coating of the tank interior will be eliminated. The welding operation is furthermore uniquely adapted for use with automatic machine welding with attendant speeding of production and reduction in labor cost.

Other modes of applying the principle of the invention may be employed, change being made as regards the details described, provided the features or steps stated in any of the following claims or the equivalent of such be employed.

I therefore particularly point out and distinctly claim as my invention:

1. A spud for boilers and the like, comprising an elongated hollow body of weldable metal having a pilot portion adapted for close-fitting insertion in an aperture in a plate and a radially projecting flange on said body, the thickness of said flange in a radial and in an axial direction being substantially equal to the thickness of such plate adjacent such aperture, said flange also being located a distance from the inner end of such pilot portion likewise substantially equal to such plate thickness, said flange further having a sharply defined outwardly directed edge adapted to attract and hold an arc applied in the vicinity of said flange, whereby upon circumferentially traversing said flange edge with such arc the latter is effective simultaneously to melt only adjacent areas of such flange, such pilot portion, and edges of such plate aperture to interfuse the contacting faces thereof and provide a strong integral union.

2. A spud as claimed in claim 1 wherein said elongated hollow body is annular, and wherein said edge of the flange is also directed upwardly away from said plate aperture to assist in attracting and holding such arc and thereby maintain such arc substantially away from said plate and minimize burn-through.

References Cited in the file of this patent

UNITED STATES PATENTS

| | | |
|---|---|---|
| 874,084 | Jottrand et al. | Dec. 17, 1907 |
| 1,427,616 | Moore | Aug. 29, 1922 |
| 1,872,357 | Straty | Aug. 16, 1932 |
| 1,933,772 | Stresau | Nov. 7, 1933 |
| 1,937,605 | Taylor | Dec. 5, 1933 |
| 2,015,246 | Taylor | Sept. 24, 1935 |
| 2,583,868 | Mociun | Jan. 29, 1952 |
| 2,885,532 | Fike | May 5, 1959 |